United States Patent
Kim et al.

(10) Patent No.: US 6,782,944 B2
(45) Date of Patent: Aug. 31, 2004

(54) AIR CONDITIONER FOR VEHICLES

(75) Inventors: In Kap Kim, Taejon-Si (KR); Chang Ho Park, Taejon-Si (KR); Tae Young Park, Taejon-Si (KR)

(73) Assignee: Halla Climate Control Corp. (KR)

( * ) Notice: Subject to any disclaimer, the term of this patent is extended or adjusted under 35 U.S.C. 154(b) by 0 days.

(21) Appl. No.: 09/894,787

(22) Filed: Jun. 28, 2001

(65) Prior Publication Data

US 2003/0000691 A1 Jan. 2, 2003

(51) Int. Cl.$^7$ .............................. B60H 1/00; B60H 3/00; F25B 29/00
(52) U.S. Cl. ........................ 165/203; 165/202; 165/204; 165/42; 165/43; 454/156; 454/160; 454/161; 454/139
(58) Field of Search ................................. 165/203, 202, 165/204, 42, 43; 454/156, 160, 161, 139

(56) References Cited

U.S. PATENT DOCUMENTS 5,862,677 A * 1/1999 Kim et al. ...................... 165/42
6,213,198 B1 * 4/2001 Shikata et al. ............... 165/202

FOREIGN PATENT DOCUMENTS

| JP | 60-8105 | * | 1/1985 |
|---|---|---|---|
| JP | 09-024722 | | 1/1997 |
| JP | 09-024723 | | 1/1997 |
| JP | 09-156348 | | 6/1997 |
| JP | 09-240247 | | 9/1997 |
| JP | 09-240248 | | 9/1997 |
| JP | 9-254630 | * | 9/1997 |
| JP | 10-6746 | * | 1/1998 |
| JP | 10-000915 | | 1/1998 |
| JP | 10-016539 | | 1/1998 |
| JP | 10-086637 | | 4/1998 |
| JP | 11-180128 | * | 7/1999 |
| JP | 11-208238 | * | 8/1999 |
| JP | 11-208240 | * | 8/1999 |

* cited by examiner

Primary Examiner—John K. Ford
(74) Attorney, Agent, or Firm—Lowe Hauptman Gilman & Berner, LLP

(57) ABSTRACT

An air conditioner for vehicles is disclosed. This air conditioner feeds recirculation and fresh air in a separate air feeding or a mixed air feeding using a single intake duct and a single intake control door, thus improving its heating and defrosting efficiency during a heating mode operation, and preventing an undesired discharging of white fogging from the vents during a cooling mode operation by changing its air feeding mode from a recirculation air mode to a fresh air mode. This air conditioner also has a simple construction and is reduced in its production cost.

17 Claims, 10 Drawing Sheets

AIR CONDITIONER FOR VEHICLES

BACKGROUND OF THE INVENTION

1. Field of the Invention

The present invention relates to air conditioners for vehicles and, more particularly, to an air conditioner for vehicles having a two layer flow structure, designed to feed recirculation air and fresh air in a separate air feeding or a mixed air feeding using a single intake duct and a single intake control door, thus improving its heating and defrosting efficiency during a heating mode operation, and preventing an undesired discharging of white fogging from the vents during a cooling mode operation by changing its air feeding mode from a recirculation air mode to fresh air feeding mode.

2. Description of the Prior Art

FIG. 10 is a view, showing the construction and operation of a conventional air conditioner for vehicles. As shown in the drawing, the conventional air conditioner for vehicles typically comprises a cooling unit and a heating unit, either of which is selectively operated as desired. In an operation of the conventional air conditioner in a cooling mode, a compressor 61 is operated by the rotating force of the internal combustion engine (not shown) of a vehicle to compress refrigerant prior to feeding the compressed refrigerant to a condenser 62. At the condenser 62, ambient air forcibly fed from a cooling fan (not shown) absorbs heat from the refrigerant, thus condensing and cooling the refrigerant. The condensed refrigerant from the condenser 62 then passes through a receiver dryer 63, an expansion valve 64, and an evaporator 65 sequentially prior to being returned to the compressor 61, thus accomplishing one refrigeration cycle. During the above-mentioned refrigeration cycle, pressurized air fed from the fan 661 of a blower unit 66 passes by the evaporator 65 while losing heat to the cold refrigerant, thus becoming cooled air prior to being discharged from the housing of the air conditioner into the passenger compartment of the vehicle. In an operation of the air conditioner in a heating mode, the pressurized air fed from the fan 661 of the blower unit 66 is heated by hot coolant passing through a heater core 67 when the hot coolant is returned to the engine through the heater core 67. During the heating mode, the air is thus heated prior to being discharged from the housing of the air conditioner into the passenger compartment, while the coolant is cooled prior to being returned to the engine.

In such a conventional air conditioner, both the evaporator 65 and the heater core 67 are set within the housing 7 of the air conditioner. The blower unit 66 is installed inside the air inlet end of the housing 7 at a position in front of the evaporator 65, while three air outlet vents: a defrost vent 71, a face vent 72 and a floor vent 73 are provided in the air outlet end of the housing 7 at positions in back of the heater core 67. Of the three air outlet vents, the defrost vent 71 discharges warm or cold air from the housing 7 to the windshield and side glasses of the vehicle, thus defrosting the windshield and side glasses. The face vent 72 discharges warm or cold air from the housing 7 to the upper portion inside the passenger compartment, thus heating or cooling the upper portion of the compartment. The floor vent 73 discharges warm or cold air from the housing 7 to the lower portion of the passenger compartment, thus heating or cooling the lower portion of the compartment. A vent control door 711, 712 or 731 is installed at each of the three air outlet vents 71, 72 and 73 to control the vents as desired.

In the conventional air conditioner, both a fresh air intake opening 663 and a recirculation air intake opening 664 are respectively formed on the upper portion of the blower case 662 of the blower unit 66 at opposite sides of the case 662, with one intake control door 665 hinged to the case 662 such that the door 665 selectively closes either of the two air intake openings 663 and 664 as desired. Therefore, when only fresh air is introduced into the housing 7 through the fresh air intake opening 663 to circulate the fresh air in the passenger compartment during an operation of the air conditioner, the compressor 61 is undesirably overloaded to excessively consume power of the engine. On the other hand, when only recirculation air is introduced into the housing 7 through the recirculation air intake opening 664 to circulate the recirculation air in the passenger compartment during an operation of the air conditioner, the circulated air within the passenger compartment is gradually reduced in its freshness to become contaminated, thus ill-affecting the passenger's health. When the intake control door 665 is positioned at its neutral position to allow fresh air and recirculation air to be mixed together, the recirculation air included in the mixed air is continuously discharged into the passenger compartment during an operation of the air conditioner, thus preventing the passengers from feeling freshness of the fresh air and forcing the passengers to feel unpleasant.

In an effort to overcome such problems experienced in the conventional air conditioner for vehicles, another air conditioner designed to feed recirculation air and fresh air into the passenger compartment in a separate air feeding or a mixed air feeding, has been proposed.

Japanese Patent Laid-open Publication No. Heisei. 9-24722 discloses an example of such air conditioners. This air conditioner has three air intake openings, with two intake control doors used for controlling the flow of recirculation and fresh air through the three intake openings. However, this air conditioner is problematic in that it requires too many parts, inducing a complex construction, due to the complex mechanism for operating the intake control door.

Another example of such air conditioners may be referred to Japanese Patent Laid-open Publication No. Heisei. 9-24723. This air conditioner has first and second air intake openings designed to selectively recirculation or fresh air, in addition to a third air intake opening used for intaking recirculation air exclusively, with two intake control doors used for controlling the flow of recirculation and fresh air through the three intake openings. However, this air conditioner is problematic in that it requires too many parts, inducing a complex construction, due to the complex mechanism for operating the intake control door in the same manner as described above.

A further example of such air conditioners may be referred to Japanese Patent Laid-open Publication Nos. Heisei. 9-156348 and Heisei. 10-16539. Each of these air conditioners has one fresh air intake opening and two recirculation air intake openings, with two intake control doors used for controlling the flow of recirculation and fresh air through the three intake openings. In addition, Japanese Patent Laid-open Publication Nos. Heisei. 9-240247, Heisei. 9-240248 and Heisei. 10-86637 each disclose an air conditioner having one recirculation air intake opening, one fresh air intake opening, and two intake control door of the sliding type used for controlling the flow of recirculation or fresh air through the recirculation air intake opening and the fresh air intake opening. This air conditioner also has one recirculation air intake opening controlled by a separate intake control door. As further prior art reference documents, Japanese Patent Laid-open Publication Nos. Heisei. 10-915 and Heisei. 10-86637 each disclose an air conditioner having one recirculation air intake opening and one fresh air intake opening with one intake control door used for controlling the flow of recirculation or fresh air through the recirculation air intake opening and fresh air intake opening. This air conditioner also has one recirculation air intake opening controlled by a separate intake control door.

However, the above-mentioned air conditioners are problematic in that they have two intake control doors for controlling the flow of recirculation and fresh air relative to the housing, with a link mechanism for accomplishing a cooperative operation of the intake control doors, thus necessarily having too many parts and a complex construction.

SUMMARY OF THE INVENTION

Accordingly, the present invention has been made keeping in mind the above problems occurring in the prior art, and an object of the present invention is to provide an air conditioner for vehicles, which is designed to feed recirculation and fresh air in a separate air feeding or a mixed air feeding using a single intake duct and a single intake control door, thus improving its heating and defrosting efficiency during a heating mode operation, and preventing an undesired discharging of white fogging from the vents during a cooling mode operation by changing its air feeding mode from a recirculation air mode to a fresh air mode, and which preferably is simplified in its construction, in addition to being reduced in its production cost.

In order to accomplish the above object, the present invention provides an air conditioner for vehicles. The air conditioner comprises a housing, a partition member, a first heat exchanger, a first blower fan and a second blower fan. The housing defines a chamber and the chamber defines first and second openings configured to allow first and second air flows to enter an inside of the chamber, respectively. The partition member is configured to divide the inside of the housing into first and second passages. The partition member extends through the inside of the chamber and is configured to divide the chamber into first and second compartments. The first heat exchanger is configured to pass through an opening in the partition member so as to be located in the first and second passages. The first blower fan is located in the first compartment of the chamber and is configured to blow at least one of the first and second air flows to the first heat exchanger along the first passage. The second blower fan is located in the second compartment of the chamber and is configured to blow at least one of the first and second air flows to the first heat exchanger along the second passage.

According to the invention, a communication vent opened or closed by a vent control door is preferably formed at the rear portion of the horizontal partition wall to allow the upper and lower air passages to communicate to each other selectively.

In a fresh air mode operation of the heating, the intake control door closes the recirculation air intake opening of the intake duct. Therefore, only fresh air is introduced into the intake duct through the fresh air intake opening, and flows into both the upper and lower scroll compartments through the air guide duct, and flows through the upper and lower air passages prior to being discharged into the passenger compartment.

In a recirculation air mode operation of the air conditioner, the intake control door closes the fresh air intake opening of the intake duct. Therefore, only recirculation air is introduced into the intake duct through the recirculation air intake opening, and flows into both the upper and lower scroll compartments through the air guide duct, and flows through the upper and lower air passages prior to being discharged into the passenger compartment.

In a separate air feeding operation of the air conditioner, the intake control door is aligned with the passage dividing means, thus allowing the recirculation and fresh air intake openings of the intake duct to separately communicate with the lower and upper scroll compartments through the air guide duct. Therefore, fresh air and recirculation air separately flow through the upper and lower air passages prior to being separately discharged from the housing into the passenger compartment.

In a mixed air feeding operation of the air conditioner, the intake control door is positioned at a space between the passage dividing means and the fresh air intake opening. Therefore, recirculation air from the recirculation air intake opening flows to both scroll compartments, while fresh air from the fresh air intake opening only flows to the lower scroll compartment. Mixed air of the recirculation air and the fresh air from the upper scroll compartment flows through the upper air passage prior to being discharged into the passenger compartment, while recirculation air from the lower scroll compartment flows through the lower air passage prior to being discharged into the passenger compartment.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
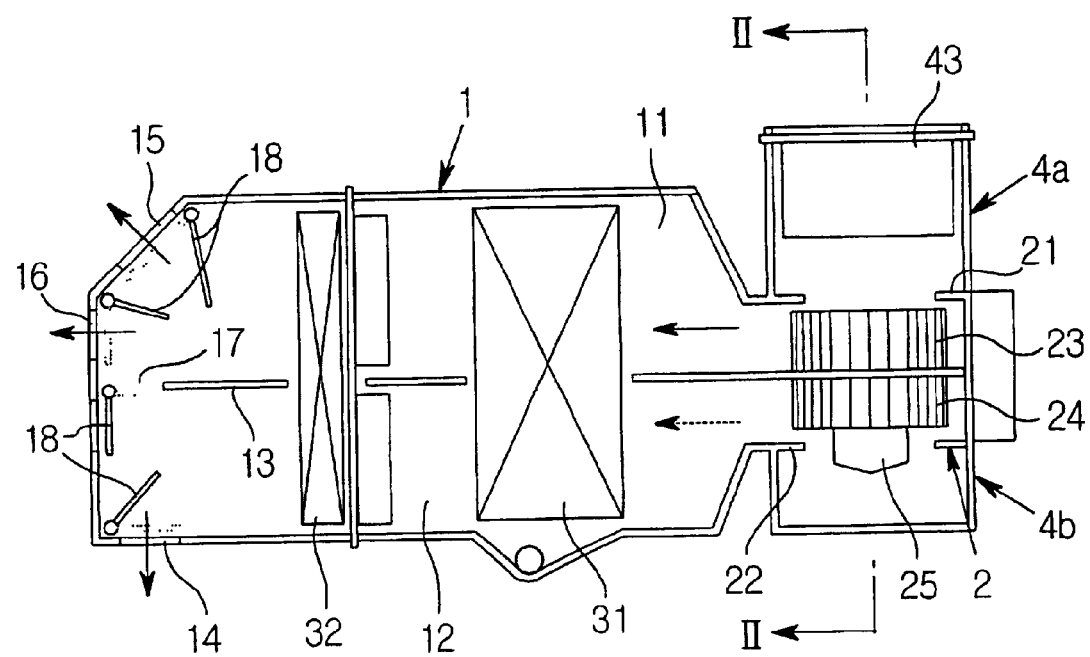
FIG. 1 is a sectional view, showing an operation of an air conditioner for vehicles in accordance with the preferred embodiment of the present invention during a fresh air mode.

Reference now should be made to the drawings, in which the same reference numerals are used throughout the different drawings to designate the same or similar components. FIG. 1 is a sectional view, showing an operation of an air conditioner for vehicles in accordance with the preferred embodiment of the present invention during a fresh air mode. In the drawing, the reference numeral 1 denotes the housing of the air conditioner, with an evaporator 31 and a heater core 32 set in the front and back of the interior of the housing 1. A horizontal partition wall 13 is arranged at the central portion inside the housing 1 to divide the interior of the housing 1 into upper and lower air passages 11 and 12. A floor vent 14 is formed on the housing 1 at a position around the air outlet end of the lower air passage 12 such that the floor vent 14 is opened toward the floor of the vehicle's passenger compartment. In addition, both a defrost vent 15 and a face vent 16 are formed on the housing 1 at positions around the air outlet end of the upper air passage 11. In such a case, the defrost vent 15 is opened toward the windshield and side glasses, while the face vent 16 is opened toward the upper portion of the interior of the passenger compartment. A communication vent 17 is formed at the rear portion of the partition wall 13 to allow the upper and lower air passages 11 and 12 to communicate to each other. Each of the above-mentioned vents 14, 15, 16 and 17 is provided with a vent control door 18, thus being closed or opened as desired.

Figure 2:
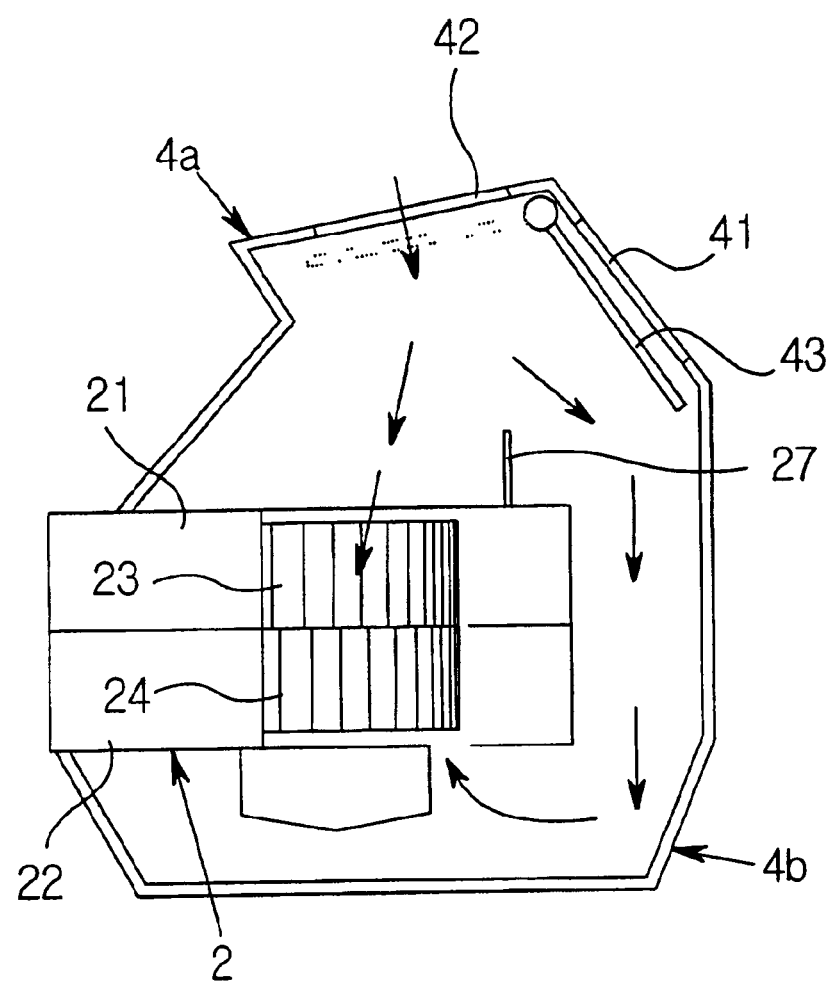
FIG. 2 is a sectional view of the air conditioner taken along the line II—II of FIG. 1.

As shown in FIGS. 1 and 2, a scroll case 2 is installed at the air inlet end of the housing 1, with the interior of the scroll case 2 divided into upper and lower scroll compartments 21 and 22 by a horizontal extension of the partition wall 13. An upper blower fan 23 is rotatably set within the upper scroll compartment 21, while a lower blower fan 24 is rotatably set within the lower scroll compartment 22. The two fans 23 and 24 are commonly operated by the rotating force of a drive motor 25 installed at the lower portion of the lower scroll compartment 22.

In the drawings, the reference numeral 4a denotes a intake duct, with a recirculation air intake opening 41 and a fresh air intake opening 42 formed on the intake duct 4a and selectively opened or closed by a intake control door 43. The reference numeral 4b denotes an air guide duct. The air guide duct 4b is connected with both the scroll case 2 and the air inlet end of the housing 1. Therefore the air guide duct 4b guides recirculation or fresh air from a selected air intake opening 41 or 42 to one of the upper and lower scroll compartments 21 and 22.

Figure 9:
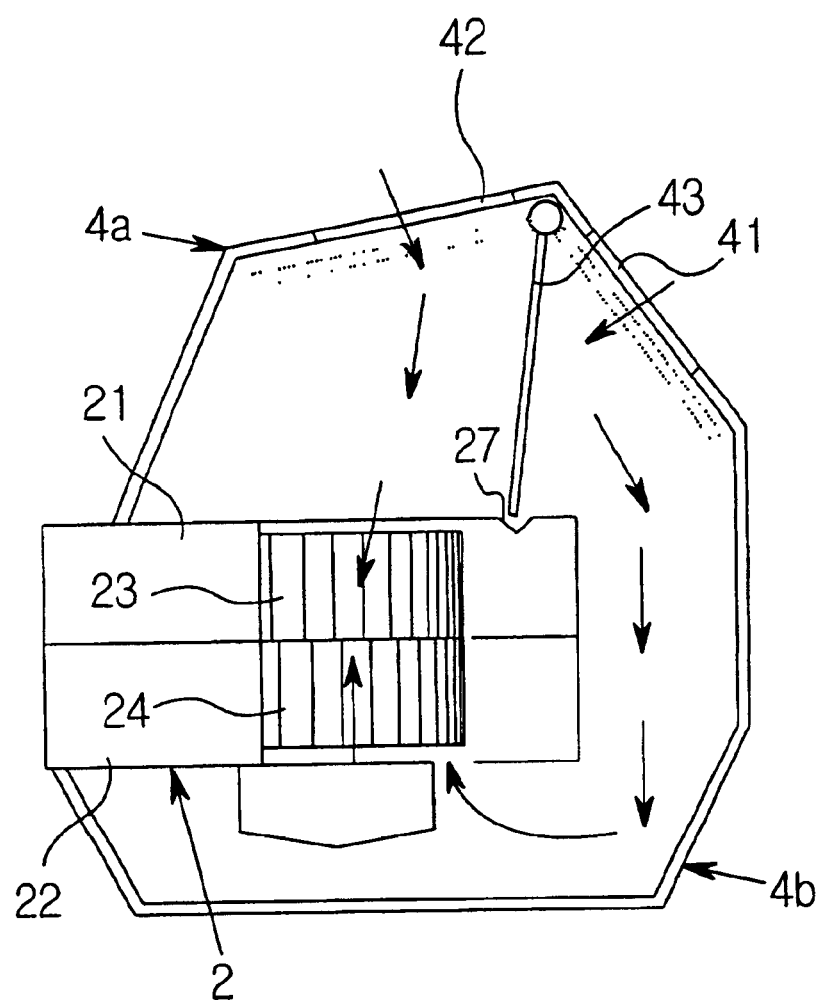
FIG. 9 is a sectional view of scroll case having other passage dividing means.
Figure 10:
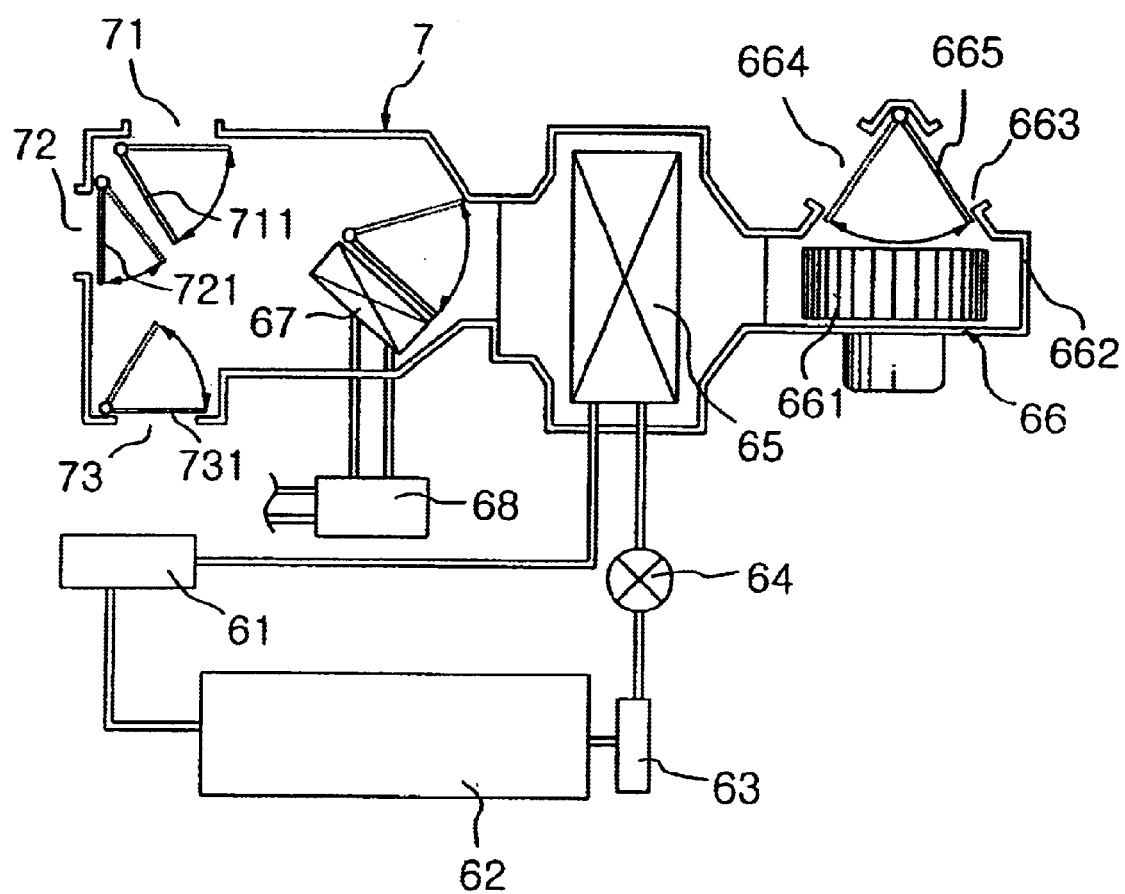
FIG. 10 is a view, showing the construction and operation of a conventional air conditioner for vehicles.

In an operation of the air conditioner of this invention, it is sometime necessary to allow recirculation air to exclusively flow into the lower scroll compartment 22 through the air guide duct 4b and fresh air to exclusively flow into the upper scroll compartment 21. In order to accomplish the above object, a passage dividing means 27 is preferably formed on the top wall of the upper scroll compartment 21 such that it selectively divides the interior of the intake duct 4a into two passages, separately communicating with the upper scroll compartment 21 and the lower scroll compartments 22, in cooperation with the vent control door 43 placed at a predetermined position. The passage dividing means 27 is preferably formed to the shape of prominence (FIG. 2) or the shape of depression (FIG. 9).

The operational effect of the air conditioner of this invention will be described herein below.

In a fresh air mode operation of the air conditioner as shown in FIGS. 1 and 2, the intake control door 43 closes the recirculation air intake opening 41 of the intake duct 4a, but opens the fresh air intake opening 42. Therefore, only fresh air is introduced into the intake duct 4a through the fresh air intake opening 42. The fresh air is thus introduced into both the upper scroll compartment 21 and the lower scroll compartment 22 through the air guide duct 4b, and flows into the upper and lower air passages 11 and 12 by the blowing force of the upper and lower blower fans 23 and 24. When the fresh air flows through the upper and lower air passages 11 and 12, it passes by the evaporator 31 and the heater core 32, thus being cooled by the evaporator 31 or warmed by the heater core 32. The cold air or warm air flows to the air outlet ends of the upper and lower air passages 11 and 12 prior to being discharged from the housing 1 into the passenger compartment of a vehicle through the vents 14, 15 and 16.

Figure 3:
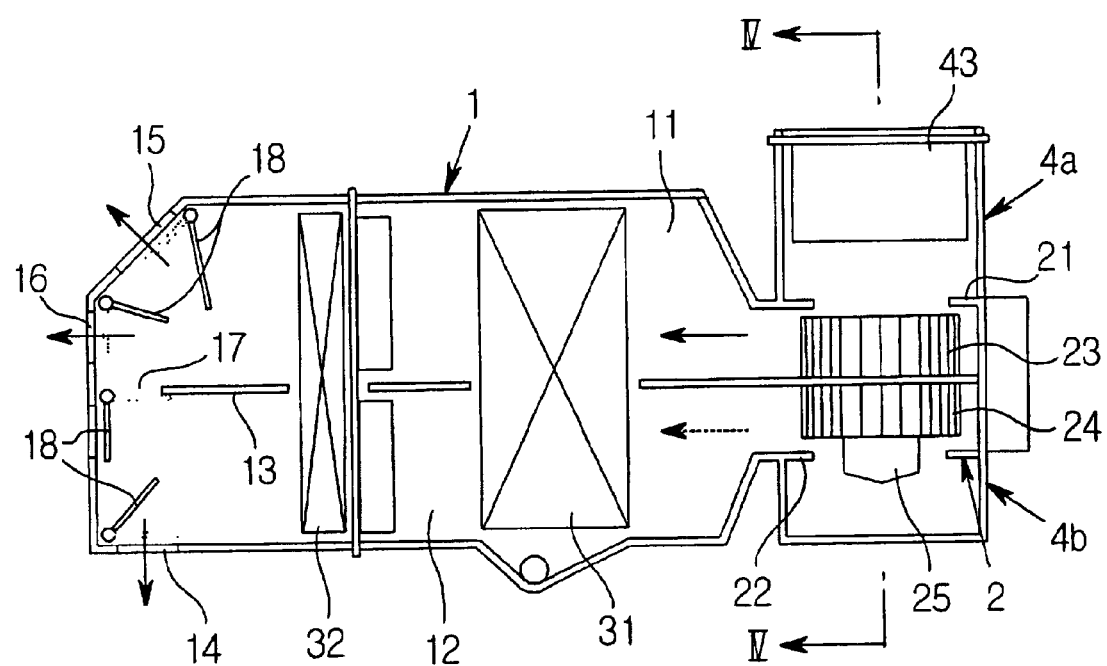
FIG. 3 is a sectional view, showing an operation of the air conditioner of this invention during a recirculation air mode.
Figure 4:
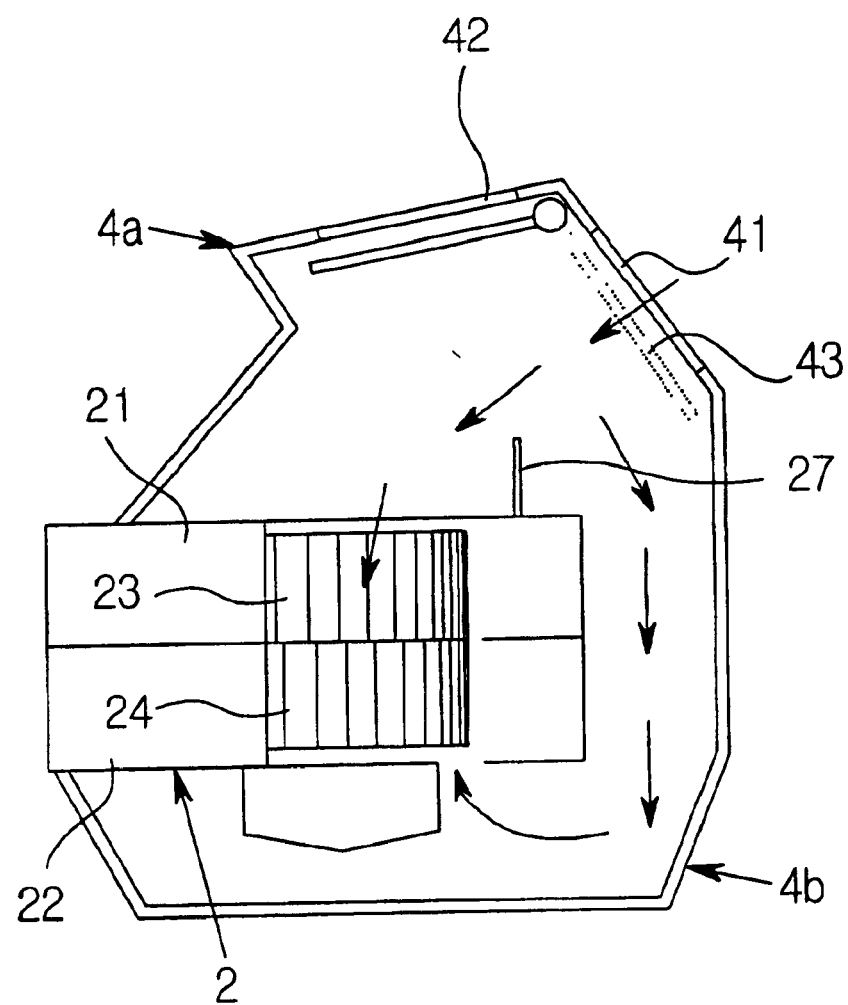
FIG. 4 is a sectional view of the air conditioner taken along the line IV—IV of FIG. 3.

In a recirculation air mode operation of the air conditioner as shown in FIGS. 3 and 4, the intake control door 43 closes the fresh air intake opening 42 of the intake duct 4a, but opens the recirculation air intake opening 41. Therefore, only recirculation air is introduced into the intake duct 4a through the recirculation air intake opening 41. In such a case, the recirculation air is introduced into both the upper scroll compartment 21 and the lower scroll compartment 22 through the air guide duct 4b, and flows into the upper and lower air passages 11 and 12 by the blowing force of the upper and lower blower fans 23 and 24. When the recirculation air flows through the upper and lower air passages 11 and 12, it passes by the evaporator 31 and the heater core 32, thus being cooled by the evaporator 31 or warmed by the heater core 32. The cold air or warm air flows to the air outlet ends of the upper and lower air passages 11 and 12 prior to being discharged from the housing 1 into the passenger compartment through the vents 14, 15 and 16.

Figure 5:
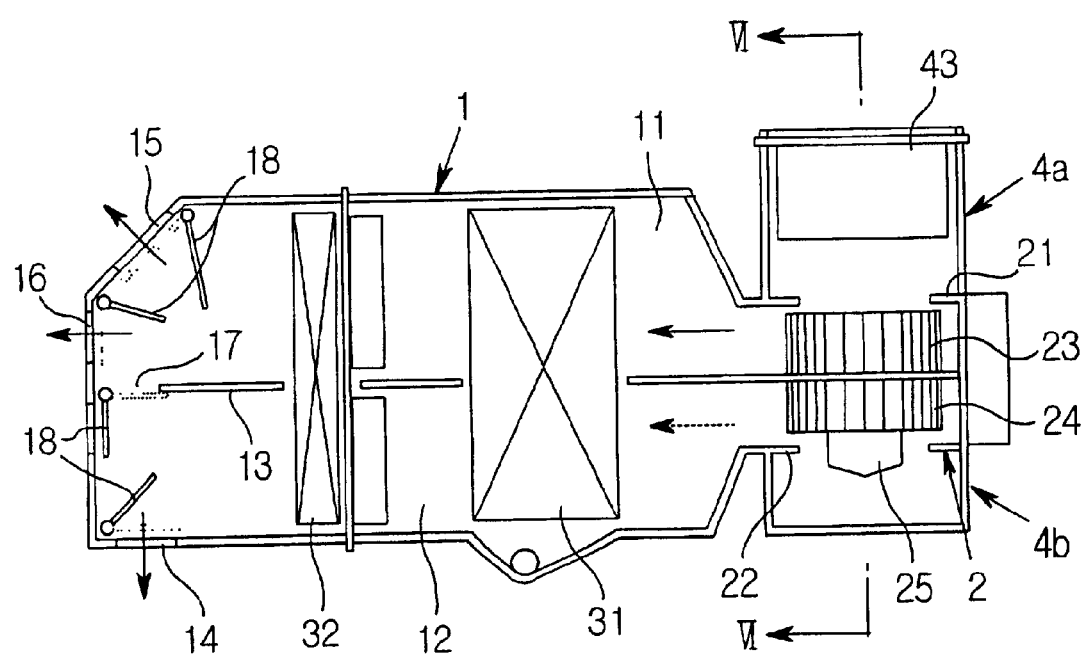
FIG. 5 is a sectional view, showing an operation of the air conditioner of this invention during a separate air feeding.
Figure 6:
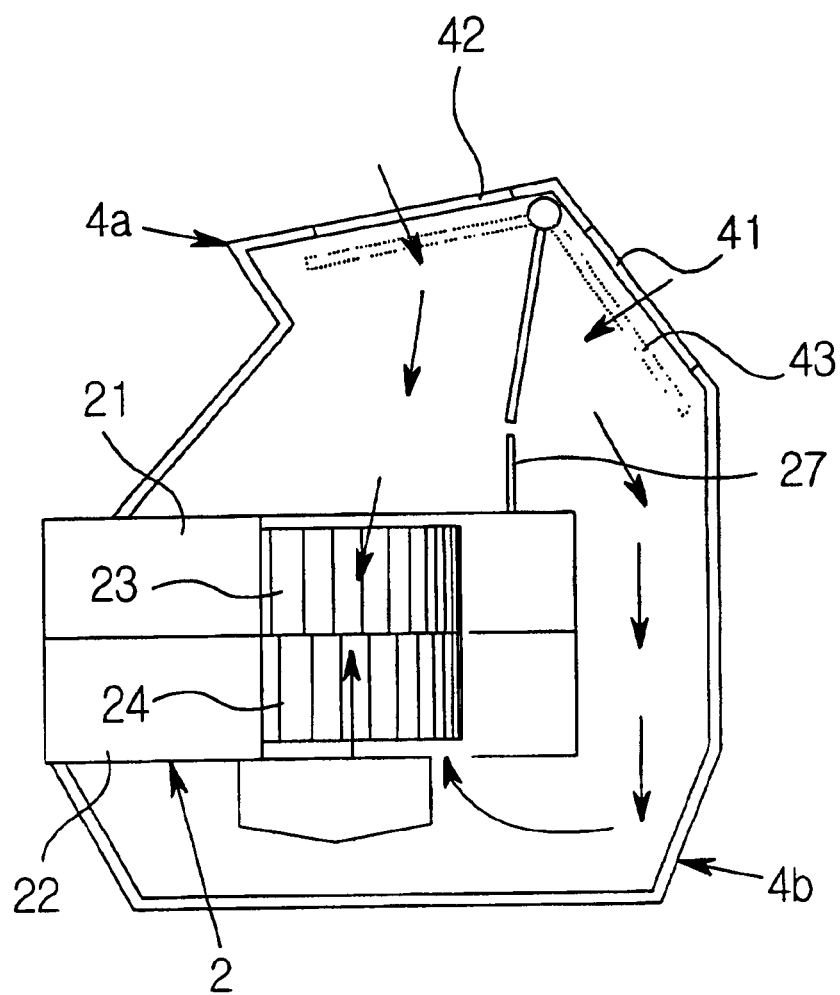
FIG. 6 is a sectional view of the air conditioner taken along the line VI—VI of FIG. 5.

In a separate air feeding operation of the air conditioner as shown in FIGS. 5 and 6, the intake control door 43 is rotated such that the free end of the door 43 is aligned with the passage dividing means 27. Therefore, the recirculation air intake opening 41 and the fresh air intake opening 42 of the intake duct 4a are opened. In such a case, the recirculation air intake opening 41 communicates with the lower scroll compartment 22, while the fresh air intake opening 42 communicates with the upper scroll compartment 21. Therefore, fresh air, introduced into the upper scroll compartment 21 through the fresh air intake opening 42, flows into the upper air passage 11 by the blowing force of the upper blower fan 23. recirculation air, introduced into the lower scroll compartment 22 through the recirculation air intake opening 41 and the air guide duct 4b, flows into the lower air passage 12 by the blowing force of the lower blower fan 24. When the fresh air and recirculation air separately flow into the upper and lower air passages 11 and 12 as described above, they pass by the evaporator 31 and the heater core 32, thus being separately cooled by the evaporator 31 or warmed by the heater core 32. The cold air or warm air flows to the air outlet ends of the upper and lower air passages 11 and 12 prior to being discharged from the housing 1 into the passenger compartment through the vents 14, 15 and 16.

Figure 7:
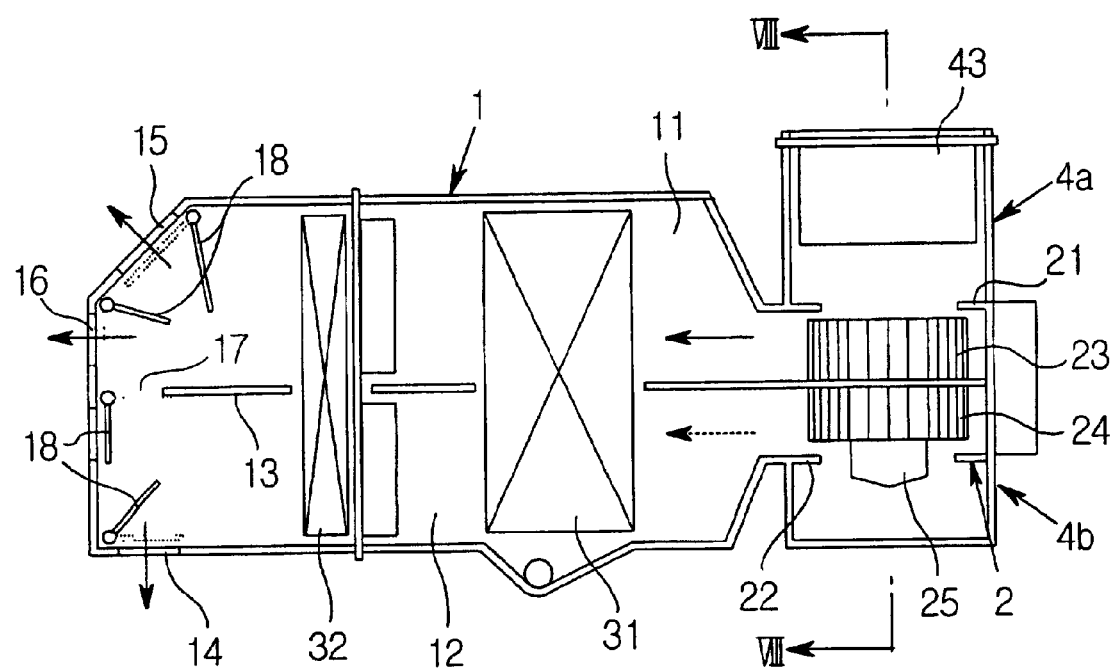
FIG. 7 is a sectional view, showing an operation of the air conditioner of this invention during a mixed air feeding.
Figure 8:
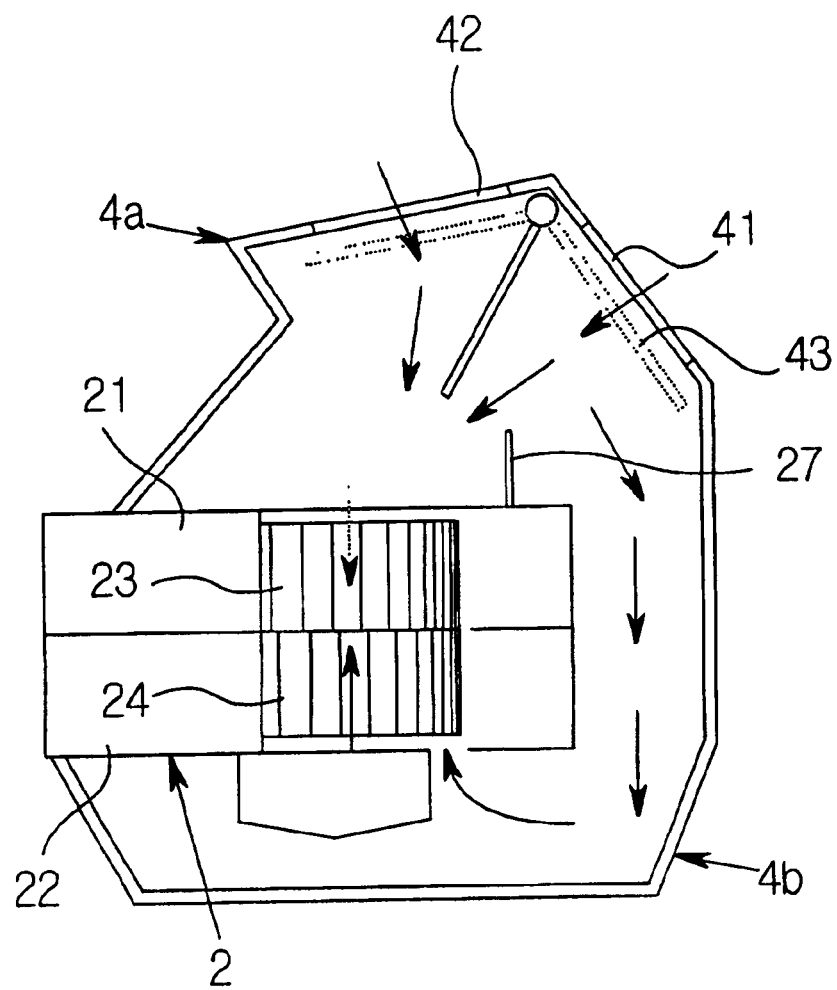
FIG. 8 is a sectional view of the air conditioner taken along the line VIII—VIII of FIG. 7.

In a mixed air feeding operation of the air conditioner as shown in FIGS. 7 and 8, the intake control door 43 is rotated such that it is positioned at a space between the passage dividing means 27 and the fresh air intake opening 42. The recirculation air intake opening 41 and the fresh air intake opening 42 of the intake duct 4a are thus opened in the same manner as that described for the separate air feeding mode operation. However, since the vent control door 43 is not aligned with the passage dividing means 27, but is somewhat raised toward the fresh air intake opening 42 while leaving an opening between the passage dividing means 27 and the intake control door 43 as best seen in FIG. 8, the recirculation air from the recirculation air intake opening 41 flows to both scroll compartments 21 and 22. However, the fresh air from the fresh air intake opening 41 is less likely to flow to the lower scroll compartment 22, but only flows to the upper scroll compartment 21. Therefore, the upper scroll compartment 21 receives mixed air of the recirculation air and the fresh air, while the lower scroll compartment 22 only receives the recirculation air. The mixed air of the recirculation air and the fresh air from the upper scroll compartment 21 flows into the upper air passage 11 by the blowing force of the upper blower fan 23, while the recirculation air from the lower scroll compartment 22 through the air guide duct 4b flows into the lower air passage 12 by the blowing force of the lower blower fan 24. When the mixed air and recirculation air separately flow through the upper and lower air passages 11 and 12 as described above, they pass by the evaporator 31 and the heater core 32, thus being separately cooled by the evaporator 31 or warmed by the heater core 32. The cold air or warm air flows to the air outlet ends of the two air passages 11 and 12 prior to being discharged from the housing 1 into the passenger compartment through the vents 14, 15 and 16.

The mixed air feeding mode operation is preferably usable in a cooling mode operation of the air conditioner as follows. That is, when the air conditioner continuously carries out a recirculation air mode operation as a cooling mode operation, circulated air may be gradually reduced in its freshness since it is contaminated as time goes by. Therefore, it is necessary to intermittently introduce fresh air into the passenger compartment to refresh the circulated air. When high temperature and high-humidity fresh air is introduced into the housing of the air conditioner to refresh the circulated air during such a cooling mode operation, conventional air conditioners may undesirably force some of the condensed water of the fresh air through the air outlet vents as white fogging since the high temperature and high-humidity fresh air comes into contact with the low temperature and low-humidity surface of the evaporator. However, the air conditioner of this invention does not allow such white fogging to be discharged from the air outlet vents since it is possible to reduce the difference in the temperature and humidity between the air and the evaporator by mixing the low temperature and low-humidity indoor air and the high temperature and high-humidity fresh air together within the intake duct 4a prior to feeding the mixed air to the evaporator by the blowing force of the fans 23 and 24.

During each of the above-mentioned operational modes of the air conditioner, it is possible to separately discharge cold or warm air currents from the upper and lower air passages into the passenger compartment, or discharge the cold or warm air currents from the air passages after mixing the air currents together by controlling the communication vent 17 of the horizontal partition wall 13.

As described above, the present invention provides an air conditioner for vehicles, which is designed to feed recirculation air and fresh air in a separate air feeding or a mixed air feeding using a single intake duct 4a and a single intake control door 43. This air conditioner thus has a simple construction and reduced production cost, in addition to accomplishing the recent trend of compactness of air conditioners. The air conditioner is also improved in its heating and defrosting efficiency during a heating mode operation, and prevents an undesired discharging of white fogging from the vents during a cooling mode operation by changing its air feeding mode from a recirculation air mode to a fresh air mode.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An air conditioner for use in a vehicle, comprising:
a housing comprising first and second inlets;
a single scroll case having first and second compartments, the first compartment having an opening on a first scroll case wall, the second compartment having an opening on a second scroll case wall;
a single door located in an area in proximity to the first and second inlets, the door being configured to change a position thereof within the door area;
a first air passage extending from the door area to the opening of the first compartment;
a second air passage extending from the door area to the opening of the second compartment along a housing wall, which is a wall of the housing formed around the first and second scroll case walls; and
a structure formed on a surface of the scroll case facing the door area;
wherein the single door and the first and second inlets are all configured to face one or the other of the openings of the first and second compartments, the structure comprises a wall extending from the scroll case toward the door area, the structure is configured such that the position of the door relative to the structure can control air flows into the first and second passages from at least one of the first and second inlets, and the structure is further configured such that, when the door is in a position closest to the structure, he first air passage is connected substantially to the first inlet while the second air passage is connected substantially to the second inlet.

2. The air conditioner of claim 1, wherein the structure is further configured such that, when the door is in a position closest to the structure, the door area is divided into two passages with substantially no fluid communication with each other.

3. The air conditioner of claim 1, wherein the structure is further configured such that the position of the door relative to the structure determines relative amounts of air flows through the first and second inlets into the door area, and further determines relative amounts of air flows through the first and second air passages.

4. The air conditioner of claim 1, wherein the door is hinged at a point between the first and second inlets, and configured to hingedly move between a position closing the first inlet and a position closing the second inlet.

5. The air conditioner of claim 4, wherein both of the first and second inlets are at least partially open when the door is at a position between the two closing positions.

6. The air conditioner of claim 1, wherein the first and second inlets are configured to receive the air flows from different sources.

7. The air conditioner of claim 1, further comprising first and second fans, wherein the first fan is located in the first compartment and configured to generate a first air flow within the housing, wherein the second fan is located in the second compartment and configured to generate a second air flow within the housing, and wherein the housing comprises an internal structure configured to substantially separate the first air flow from the second air flow.

8. The air conditioner of claim 1, wherein the housing comprises a controllable structure configured to allow communication between the first and second air flows.

9. The air conditioner of claim 1, wherein the second scroll case wall is arranged in a substantially opposing relationship to the first scroll case wall.

10. The air conditioner of claim 1, wherein the housing wall constitutes a wall of the second air passage.

11. The air conditioner of claim 1, wherein the first and second compartments are substantially the same in size.

12. The air conditioner of claim 1, wherein the surface of the scroll case where the structure is formed is a surface of either of the first and second scroll case walls.

13. An air conditioner for use in a vehicle, comprising:

a housing comprising first and second inlets;

a single scroll case having first and second compartments, each having an opening, the openings of the first and second compartments not facing each other;

a single door located in an area in proximity to the first and second inlets, the door being configured to change a position thereof within the door area;

a first air passage extending from the door area to the opening of the first compartment;

a second air passage extending from the door area to the opening of the second compartment;

a wall extending from the scroll case toward the door area and dividing the first and second air passages; and wherein the single door and the first and second inlets are all configured to face one or the other of the openings of the first and second compartments, the wall and the single door are configured to cooperatively control air flows into the first and second passages from at least one of the first and second inlets, and the wall and the single door are further configured such that, when the door is in a position closest to the wall, the first air passage is connected substantially to the first inlet while the second air passage is connected substantially to the second inlet.

14. The air conditioner of claim 13, wherein the wall is configured such that, when the door is in a position closest to the wall, the first air passage is connected substantially solely to the first inlet while the second air passage is connected substantially solely to the second inlet.

15. The air conditioner of claim 13, wherein the second air passage comprises a portion extending along a side of the scroll case.

16. The air conditioner of claim 13, further comprising first and second fans located in the first and second compartments of the scroll case, respectively, and further comprising a motor for driving the first and second fans, wherein the motor is located outside the scroll case.

17. The air conditioner of claim 13, wherein the door is hinged at a point between the first and second inlet, and wherein the door is configured to hingedly move between a position closing the first inlet and a position closing the second inlet.

* * * * *